April 10, 1928.
L. C. HUFF
1,665,208
PIPE JOINT
Filed June 15, 1925
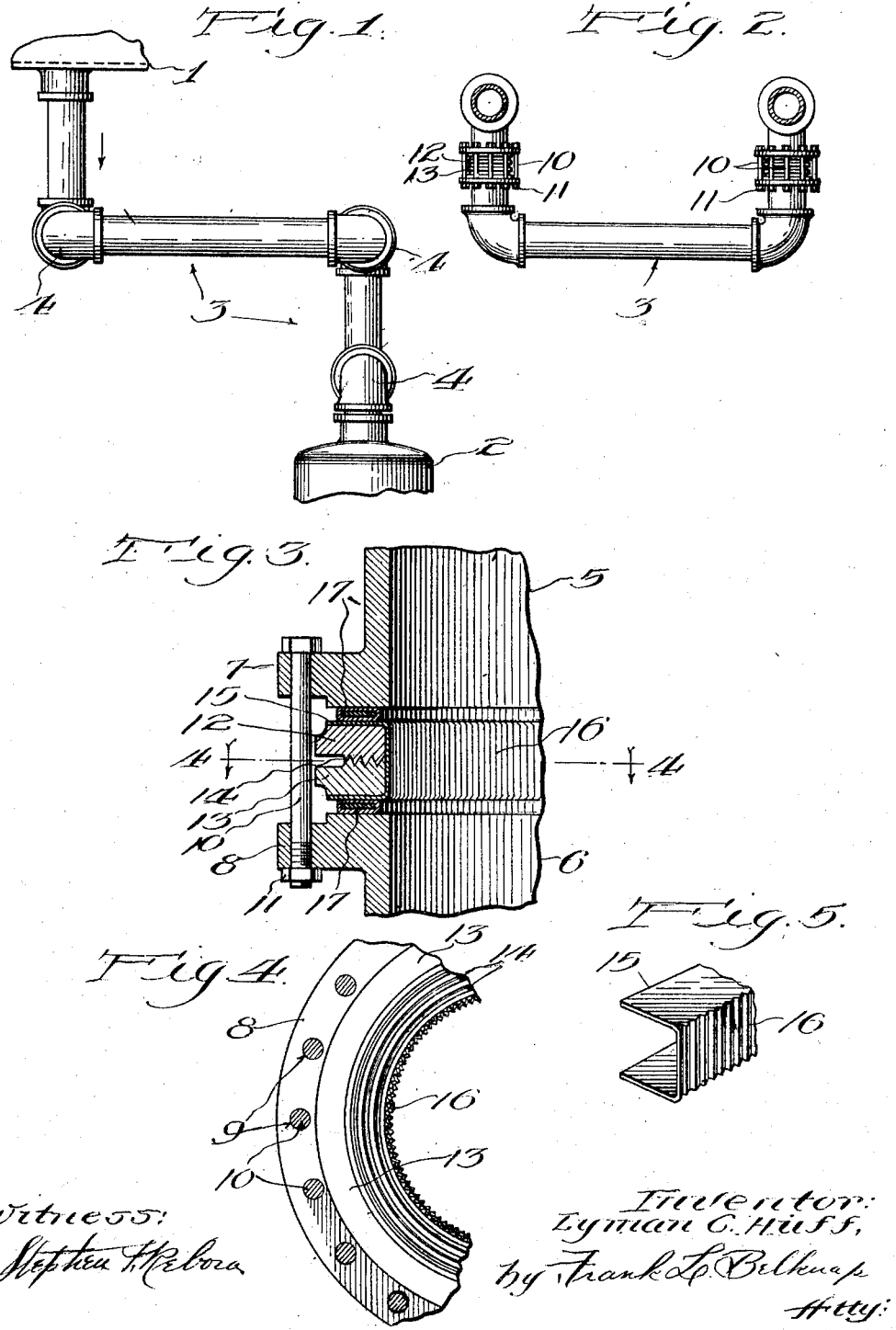

Patented Apr. 10, 1928.

1,665,208

UNITED STATES PATENT OFFICE.

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

PIPE JOINT.

Application filed June 15, 1925. Serial No. 37,123.

This invention relates to pipe joints, and refers more particularly to a novel form of rocking joint for use in lines through which hot liquid is passed.

One of the objects of the present invention is to obtain a joint between two lengths of pipe which will allow for a small degree of swinging or rocking and still retain the use of gaskets for making the joint, and eliminating the necessity of having a ground joint.

The preferred form of construction contemplates an annular substantially U-shaped corrugated gasket, placed over annular rings. The rings are adapted to engage each other and are free to independently move.

The advantages and utility of the present construction will instantly appeal to those skilled in this art, and many of the objects will be more particularly brought out in the following detailed description.

In the drawings:

Fig. 1 is a side elevational view, and Fig. 2 a top plan view illustrating one system of piping in an oil refinery connected by my improved expansion joint.

Fig. 3 is an enlarged vertical sectional view showing the details of the joint.

Fig. 4 is a cross sectional view taken on line 4—4 of Fig. 3, looking in the direction of the arrows.

Fig. 5 is an enlarged perspective view of a small section of the corrugated gasket.

Referring more in detail to the drawings, particularly to Figs. 1 and 2, 1 designates the lower end of a still, chamber or the like forming part of an apparatus for treating oil under heat from which it is desirable to transfer the heated oil to another part of the system designated as 2. The heated oil passes through the piping designated as a whole 3, connected by joints 4. Heretofore, it was found that where ground joints were used and were caused to swing or rotate, they were not satisfactory because of danger of leakage due to the movement of their opposed surfaces.

To overcome the many objections incident to the use of ground joints, the present invention was perfected.

Describing now Figs. 3, 4 and 5, assume that the two lengths of pipe designated 5 and 6 are to be joined together in such a way as to allow for expansion or contraction, due to heat of the liquid passing therethrough. The pipes 5 and 6 are preferably constructed with the integral flanges 7 and 8 apertured at spaced intervals as shown at 9 to receive the bolts 10, tightened by the nuts 11. Annular rings 12 and 13 having grooves or straight threads 14 on their opposed meeting surfaces have an annular substantially U-shaped washer 15 placed thereover. The washer is preferably constructed of thin metal such as monel or the like, and as a feature of the invention is provided with the small corrugations 16, which corrugations provide the means for taking up the movement or swing. The rings 12 and 13 may be lubricated with graphite or the like. Auxiliary gaskets 17 which may take the form of metal jacketed gaskets having an asbestos core may be provided to assist in securing a tight joint, although the employment of these auxiliary gaskets is optional.

From the foregoing description it will be readily seen that I have invented a practical rocking slip joint for hot oil piping, allowing for swinging, rocking, expansion and contraction without danger of leaking.

I claim as my invention:

1. A joint packing adapted for use in connecting lengths of tubing through which a heated medium is passed comprising relatively movable interengaging annular rings, a corrugated annular gasket enclosing portions of the rings, the corrugations in the gasket being adapted to take up movement of the joint.

2. A joint packing adapted for use in connecting lengths of tubing through which a heated medium is passed comprising freely movable annular rings having registering means on their opposed meeting surfaces, a substantially U-shaped corrugated annular gasket enclosing portions of the rings, the corrugations in the gasket being adapted to take up movement of the joint.

LYMAN C. HUFF.